United States Patent [19]

Drory et al.

[11] Patent Number: 5,321,745

[45] Date of Patent: Jun. 14, 1994

[54] ADAPTIVE EFFICIENT SINGLE/DUAL TONE DECODER APPARATUS AND METHOD FOR IDENTIFYING CALL-PROGRESSION SIGNALS

[75] Inventors: Eatamar Drory, Santa Clara; Ron A. Perry, Boulder Creek; Robert J. Machuta; Clifford N. Baumann, both of Los Gatos, all of Calif.

[73] Assignee: VMX, Inc., San Jose, Calif.

[21] Appl. No.: 937,046

[22] Filed: Aug. 27, 1992

Related U.S. Application Data

[63] Continuation-in-part of Ser. No. 889,513, May 26, 1992.

[51] Int. Cl.$^5$ .............................................. H04M 1/00
[52] U.S. Cl. ..................................... 379/351; 379/386; 379/282
[58] Field of Search .............. 379/351, 282, 283, 386, 379/339; 328/136; 340/825.48

[56] References Cited

U.S. PATENT DOCUMENTS

| | | | |
|---|---|---|---|
| 4,045,620 | 8/1977 | Westbrook | 379/386 X |
| 4,091,243 | 5/1978 | Mizrahi et al. | 379/283 X |
| 4,460,808 | 7/1984 | Battista et al. | 379/351 |
| 4,477,698 | 10/1984 | Szlam et al. | 179/90 |
| 4,677,665 | 6/1987 | Walker | 379/386 |
| 4,689,760 | 8/1987 | Lee et al. | 379/351 X |
| 4,979,214 | 12/1990 | Hamilton | 379/386 X |

OTHER PUBLICATIONS

Alan V. Oppenheim and Ronald W. Schafer, Digital Signal Processing, Prentice-Hall, Inc., pp. 287-289, 1975.
Dialogic, "Customizing D/41 Call Analysis," Application Note AN002, pp. 1-101, 1988, 1989.
L. R. Rabiner and R. W. Schafer, Digital Processing of Speech Signals, Prentice-Hall, Inc., 1978, LC Call No. TK7882.S65 R3, ISSN #0132136031.
R. E. Blahut, Fast Algorithms for Digital Signal Processing, Addison Wesley, 1987, LC Call No. TK5102.5.B535 1985, ISBN #0201101556.

Primary Examiner—James L. Dwyer
Assistant Examiner—Creighton Smith
Attorney, Agent, or Firm—Haverstock, Medlen & Carroll

[57] ABSTRACT

A process for determining the presence of either speech or one of a plurality of expected single-frequency signals on a line includes the steps of measuring the total signal energy on the line; measuring the signal energy present in each one of a plurality of selected separate frequency bands and identifying the two frequency bands having the highest signal energies; determining whether the highest signal energy exceeds a first selected threshold value; determining whether the highest signal energy exceeds the second highest signal energy by greater than a second selected threshold value; determining the amount of out-of-band signal energy; and determining whether the highest signal energy exceeds the out-of-band signal energy by greater than a third selected threshold value. A process for determining the presence of two of a plurality of expected a single-frequency signals on a line includes the steps of measuring the total signal energy on the line; measuring the signal energy present in each one of a plurality of selected separate frequency bands and identifying the three frequency bands having the highest signal energies; determining whether the two highest signal energies exceed a first selected threshold value; determining whether the second-highest energy exceeds the third-highest energy by a second selected threshold value; determining the amount of out-of-band signal energy and determining whether the sum of the two highest signal energies exceeds the out-of-band energy by a third selected threshold value; and determining whether the ratio of the two highest signal energy values exceeds a fourth selected threshold value.

A method for identifying expected call progression signals on a telephone line, comprises the steps of (1) sensing the presence of energy on the line and determining if the energy comprises speech; (2) identifying the frequency content and duration of the energy; 3) comparing the frequency content of the energy with stored information comprising the frequency content of expected signals and identifying the energy as one of the (Abstract continued on next page.)

expected call progression signals if a match is found; (4) sensing the presence of silence on the line if no match is found; (5) identifying the duration of the silence; (6) repeating steps (1) through (5) for a predetermined number of times; and then (7) comparing the frequency content of the energy, the duration of the energy, and the duration of the silence with stored information comprising the frequency content of energy, the duration of energy, and the duration of silence for a plurality of expected call progression signals and identifying the energy as one of the expected call progression signals if a match is found.

5 Claims, 10 Drawing Sheets

ADAPTIVE EFFICIENT SINGLE/DUAL TONE DECODER APPARATUS AND METHOD FOR IDENTIFYING CALL-PROGRESSION SIGNALS

RELATED APPLICATIONS

This application is a continuation-in-part of co-pending application Ser. No. 07/889,513, filed May 26, 1992.

BACKGROUND OF THE INVENTION

1. Field of the Invention

The present invention relates to circuits and other apparatus and to methods for tone decoding. More particularly, the present invention relates to apparatus and methods for decoding single tones and dual tones, such as those used in telephone applications to decode DTMF tones, dial tones, busy signals and other tones used in telephone systems, for recognizing call progress signals in PBX and other telephone systems, for adapting tone recognition systems to new environments, and for recognizing voice energy.

2. The Prior Art

Modern telephone systems automate and implement many useful functions by detecting the presence of control tones and response tones generated by the telephone company central office or local PBX in response to the condition of individual telephone sets in the system. Depending on location, telephone systems throughout the world utilize different combinations of periodic or continuous single tones and dual tones, such as dial tones, DTMF tones, ringback and no-ringback signals, busy signals, and connect signals.

Circuits are known in the prior art for detection of single and dual tones used in telephone systems, and for classifying these tones by their function. A combination of frequency decoding and cadence detection is commonly employed to identify telephone system tones. Frequency decoding, as its name suggests, identifies tones by their characteristic frequency or frequencies. Cadence detection looks for a repeating pattern in the audio signal, such as the pattern produced by a ringback or a busy signal. These patterns are called audio cadences. Once a cadence has been established, it can be classified as a single ring, a double ring, or a busy signal by comparing the periods of silence and sound to established parameters stored in or otherwise known by the circuitry. Cadence detection differentiates between the no-ringback, no-answer, busy, and connect states of a telephone system. An example of a prior art cadence detection system is found in U.S. Pat. No. 4,477,698.

The capability of a signal processing system to identify these different call progression tones and to differentiate between these tones, noise, and voice energy on a signal line would be useful capability. It is therefore an object of the invention to provide apparatus and a method which is capable of identify different call progression tones and differentiating between these tones, noise, and voice energy on a signal line.

BRIEF DESCRIPTION OF THE INVENTION

A method for determining the presence of one of a plurality of expected single-frequency signals on a signal line at a selected time includes the steps of measuring the total signal energy on the signal line at the selected time; measuring the signal energy present in each one of a plurality of selected separate frequency bands at the selected time and identifying the two frequency bands having the highest signal energies; determining whether the highest signal energy exceeds a first selected threshold value; determining whether the highest signal energy exceeds the second highest signal energy by greater than a second selected threshold value; determining the amount of out-of-band signal energy present in all frequency bands other than the frequency band containing the highest signal energy; and determining whether the highest signal energy exceeds the out-of-band signal energy by greater than a third selected threshold value.

A method for determining the presence of two of a plurality of expected a single-frequency signals on a signal line at a selected time includes the steps of measuring the total signal energy on the signal line at the selected time; measuring the signal energy present in each one of a plurality of selected frequency bands at the selected time and identifying the three frequency bands having the highest signal energies; determining whether the two highest signal energies exceed a first selected threshold value; determining whether the second-highest energy exceeds the third-highest energy by a second selected threshold value; determining the amount of out-of-band signal energy present in all frequency bands other than the frequency bands containing the two highest signal energies and determining whether the sum of the two highest signal energies exceeds the out-of-band energy by a third selected threshold value; and determining whether the ration of the two highest signal energy values exceeds a fourth selected threshold value.

A method for recognizing call-progression signals on a signal line according to the present invention includes the steps of detecting the presence of energy on the line, determining if the energy comprises human speech sounds, measuring period during which the energy is present, detecting when the energy ceases, measuring the period of silence, and comparing the frequency components of the energy, the on period and the off period with the parameters of known call-progression tones.

According to the present invention, human speech is recognized in real time by an apparatus and a method including the steps of digitizing an analog signal present on a signal line, correlating N neighboring portions of the digitized signal, performing frequency analysis using fast fourier transform (FFT) analysis on the digitized signal, identifying the three largest frequency-domain maxima, determining whether the two largest maxima are above a threshold frequency, and determining whether the ratio of the largest to the third largest maxima exceeds a predetermined value. According to the present invention, the steps of the method may be performed in real time using fixed-point hardware by approximating the correlation and FFT functions.

BRIEF DESCRIPTION OF THE DRAWINGS

FIG. 4b is a representation of the functionality of a state machine which implements the process illustrated in FIG. 4a.

FIGS. 5a–5c are flow diagrams describing the operation of the three states of the state machine depicted in FIG. 4a.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The adaptive single/dual tone decoder and method of the present invention is useful in telephony environments and finds uses in such apparatus as PBX units and other intelligent telephone equipment. Because both the apparatus and method according to the present invention are adaptive, apparatus fabricated in accordance with the teachings of the present invention may be readily employed in different environments. Such different environments include the different telephone systems encountered in different countries where tone frequencies, cadences, and other call progress signal attributes differ from one another.

Figure 1:
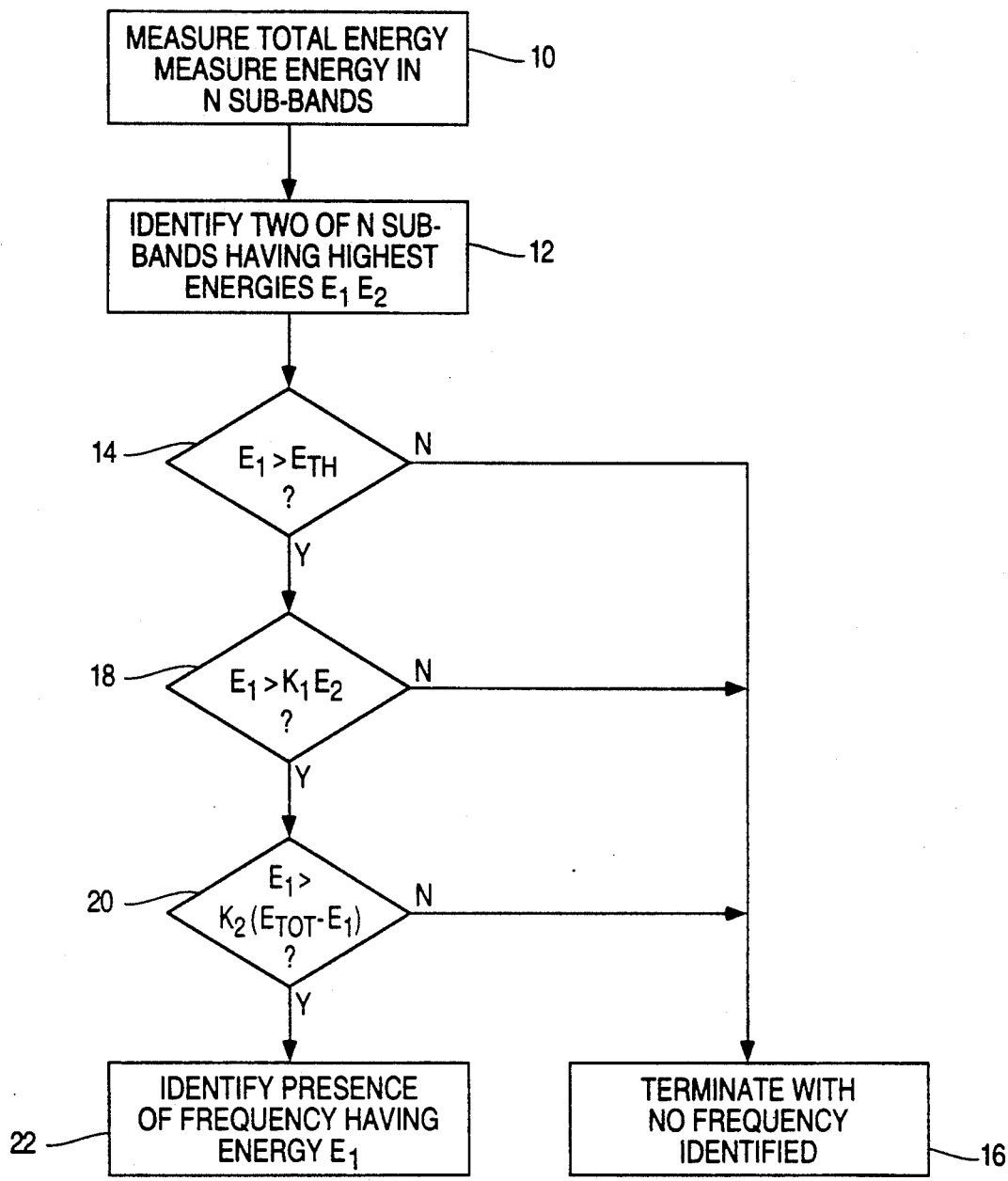
FIG. 1 is a flow diagram for a process according to the present invention for determining the presence of one of a plurality of expected single-frequency signals on a signal line at a selected time.

A process according to a presently-preferred embodiment of the invention for determining the presence of one of a plurality of expected single-frequency signals on a signal line at a selected time is illustrated in flow diagram form at FIG. 1. The process illustrated in FIG. 1 may be performed to monitor a signal line and detect the presence of a signal characterized by one of a plurality of frequencies which are expected to be present on that line at various times. In real-world telephone signal processing applications, non-exhaustive examples of such signals include dial tones and busy signals.

A first step in the process illustrated at box 10 of FIG. 1, the signal line is monitored and several measurements are made. The total amount of energy present with the bandwidth of the signal line is measured. In addition, the amount of energy present in a plurality sub bands within the bandwidth of the signal line is measured. The sub bands corresponds to the number of different single-frequency signals expected to be encountered on the signal line. The sub bands are substantially non-overlapping and each of the sub bands is chosen to encompass only one frequency from the plurality of frequencies which characterize the expected signals. Ideally, one of the expected frequencies would be at or close to the center frequency of each sub band.

Next, at box 12, the energies measured for each sub band are examined and the two sub bands containing the two highest in-band energy readings $E_1$ and $E_2$ are identified. The remaining steps in the process will utilize these measured energy values. Those of ordinary skill in the art will recognize that the steps of measuring the total energy in the entire signal bandwidth and measuring the energy in the individual sub bands can be performed simultaneously or in either order without departing from the teachings of the invention.

Next, at box 14, it is determined whether the energy of the sub band containing the highest amount of in-band energy is greater than a preselected first threshold energy value $E_{Threshold}$. If it is not, a decision is made that no one of the expected single-frequency signals is present and the process terminates at box 16.

The purpose of this first decision step is to eliminate erroneous single-frequency-signal-present decisions based upon measuring random in-band noise. The preselected first threshold energy value may be selected to assure an adequate noise margin and will vary from system to system, depending on signal strength, signal-to-noise ratio, etc. According to a presently preferred embodiment of the invention, this threshold value may typically be set to be about $-30$ to $-36$ dBM.

If the value of measured energy in the sub band containing the highest energy reading is above the first threshold energy value, the process proceeds to the step in box 18, in which the value of the energy measured in the highest sub band is compared with the energy measured in the sub band having the second highest reading. If the highest energy value does not exceed the second highest value by a second threshold amount, a decision is made that no one of the expected single-frequency signals is present and the process terminates at box 16.

The purpose of this second decision step 18 is to eliminate erroneous single-frequency-present decisions based upon measuring multi-frequency energy such as voice or music on the signal line. The second threshold amount may be selected to assure an adequate noise margin and will vary from system to system, depending on signal strength, signal-to-noise ratio, etc. According to a presently preferred embodiment of the invention, the comparison $E_1 > K_1 \times E_2$ is made where $E_1$ is the highest measured energy, $E_2$ is the second highest measured energy, and $K_1$ is a constant, which may be derived from the specifications of the signals to be measured. For example, if DTMF tones are to be detected, $K_1 = 4$ dB if $E_1$ is the high frequency and $K_1 = 8$ dB if $E_1$ is the lower frequency. This parameter is called "twist".

Next, at box 20, a process step is performed to compare the in-band energy in the sub band having the highest energy with the out-of-band energy, i.e., the total combined energy in all other bands. If the in-band energy of the sub band having the highest energy is not greater than the out-of-band energy by a third threshold amount, a decision is made that no one of the expected single-frequency signals is present and the process terminates at box 16.

The purpose of this third decision step 20 is to eliminate erroneous single-frequency-present decisions based upon measuring multi-frequency energy such as voice or music on the signal line. The second threshold amount may be selected to assure an adequate noise margin and will vary from system to system, depending on signal strength, signal-to-noise ratio, etc. According to a presently preferred embodiment of the invention, the comparison $E_1 > K_2(E_{Total} - E_1)$ is made where $E_1$ is the highest measured energy, $E_{Total}$ is the total energy measured on the signal line, the quantity ($E_{Total} - E_1$) is the out-of-band energy, and $K_2$ is a constant, which may typically be set at 6-10 for signal-to-noise ratios (SNR) greater than about 30 dB to yield high false detection immunity. This constant may be as low as 0.5 if the SNR is bad, i.e., if there is recorded voice or music program material on the line simultaneously with the tones to be detected, or if the line is noisy for other reasons.

If the in-band energy of the sub band having the highest energy is greater than the out-of-band energy by the third threshold amount, a decision is made that the one of the expected single-frequency signals which is within the sub-band from which the highest energy reading was obtained is present and the process terminates at box 22 with an identification of that frequency.

A process for determining the simultaneous presence of two of a plurality of expected single-frequency signals on a signal line at a selected time according to the present invention is illustrated with reference to FIG. 2, a flow diagram of a presently preferred embodiment of the process.

Figure 2:
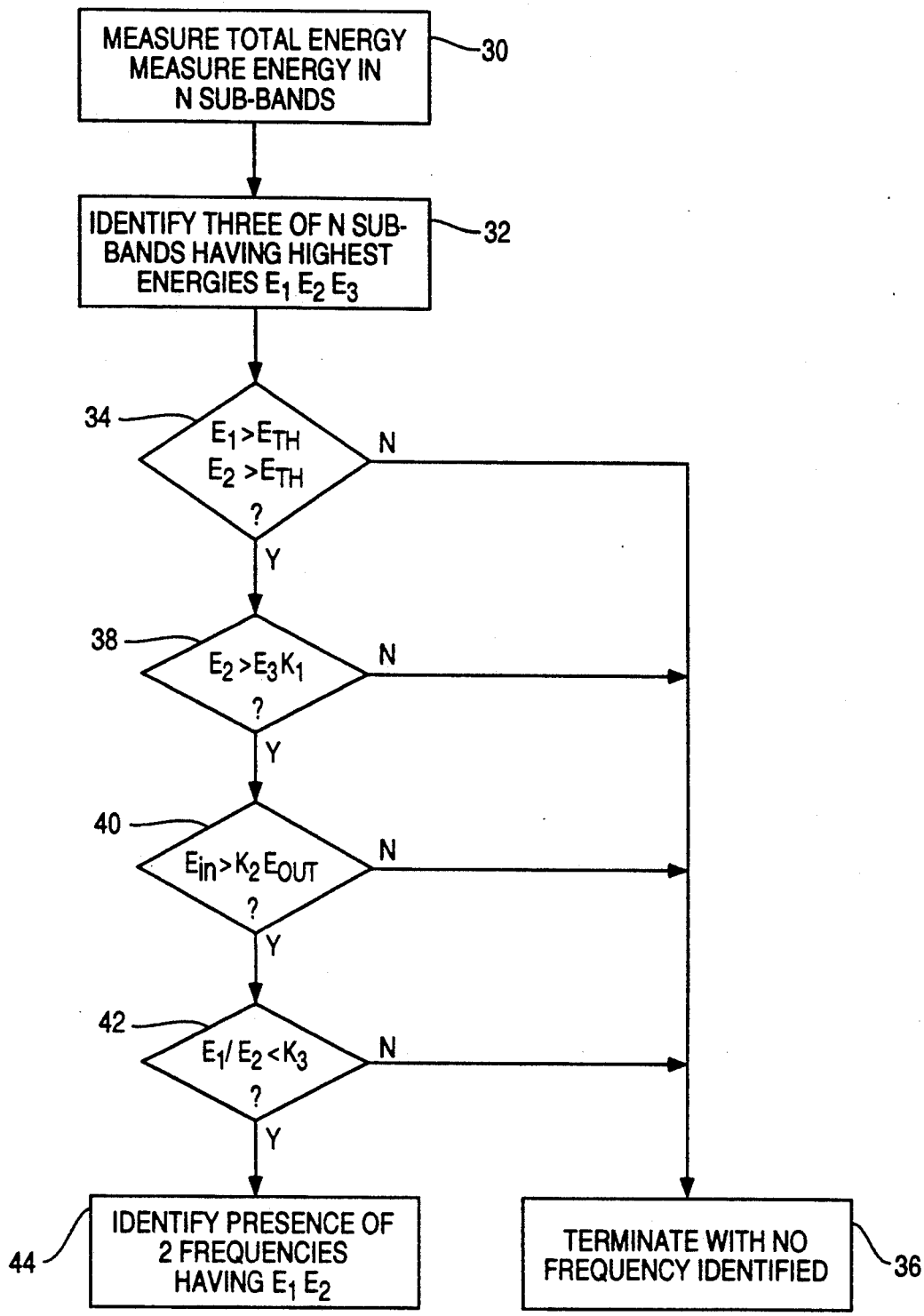
FIG. 2 is a flow diagram for a process according to the present invention for determining the presence of two of a plurality of expected single-frequency signals on a signal line at a selected time.

A first step in the process illustrated at box 30 of FIG. 2, the signal line is monitored and several measurements are made. The total amount of energy present within the bandwidth of the signal line is measured. In addition, the amount of energy present in a plurality sub bands within the bandwidth of the signal line is measured. As in the process described with reference to FIG. 1, the number of sub bands corresponds to the number of different single-frequency signals expected to be encountered on the signal line. The sub bands are substantially non-overlapping and each of the sub bands is chosen to encompass only one frequency from the plurality of frequencies which characterize the expected signals. Ideally, one of the expected frequencies would be at or close to the center frequency of each sub band.

Next, at box 32, a step is performed to select the three sub bands containing the three highest in-band energy readings $E_1$, $E_2$, and $E_3$. The remaining steps in the process will utilize these measured energy values. Those of ordinary skill in the art will recognize that the steps of measuring the total energy in the entire signal bandwidth and measuring the energy in the individual sub bands can be performed simultaneously or in either order without departing from the teachings of the invention.

Next, at box 34, it is determined whether the measured energies of the sub bands containing the two highest measured energies $E_1$ and $E_2$ are greater than a preselected first threshold energy value $E_{Threshold}$. If it is not, a decision is made that no one of the expected single-frequency signals is present and the process terminates at box 36. Those of ordinary skill in the art will recognize that, except for the selection of three sub bands and the comparison of two energy values with a threshold energy value, the steps in the process according to this embodiment of the present invention are identical to the steps performed according to the first embodiment.

The purpose of this first decision step is the same as for the first embodiment of the invention. According to a presently preferred embodiment of the invention, this threshold value may typically be set to be about $-42$ to $-48$ dB.

Next, at box 38, the energy values measured for the second and third highest sub bands are compared. If the energy value of the third highest sub band is too close to the value of the second highest sub band, more than two frequencies are present and a decision is made that a dual frequency signal, i.e., a DTMF tone, is not present and the process terminates at box 36. According to a presently preferred embodiment of the invention, $E_2 > E_3 \cdot K_1$, where $E_2$ and $E_3$ are the second and third highest measured energy values and $K_1$ is a constant. As presently preferred $K_1$ should be about 6 to 12 dB.

Next, at box 40, a step is performed to compare the in-band energy $E_{in}$ defined as ($E_1 + E_2$), the sum of the two highest measured energies, with the out-of-band energy $E_{out}$, which is defined as ($E_{Total} - E_{in}$). As presently preferred, $E_{in} > K_2 \cdot E_{out}$ must be true, where $K_2$ is a constant and which may typically be equal to about 2 to 8 dB. If the statement is not true, a decision is made that a dual frequency signal is not present and the process terminates at box 36.

If the statement is true, then a step is performed at box 42 to compare the energy values $E_1$ and $E_2$. In a presently preferred embodiment, twist is measured by testing the statement $E_1/E_2 < K_3$, where $K_3$ is a constant like $K_2$. This test is performed to insure that the two energies are fairly close in magnitude to one another before a dual-frequency tone is recognized. If the statement is not true, a decision is made that a dual frequency signal is not present and the process terminates at box 36. If the statement is true, a decision is made that a dual-frequency tone is present on the signal line and is identified as comprising the expected frequencies which lie within the sub bands from which $E_1$ and $E_2$ were measured.

Figure 3:
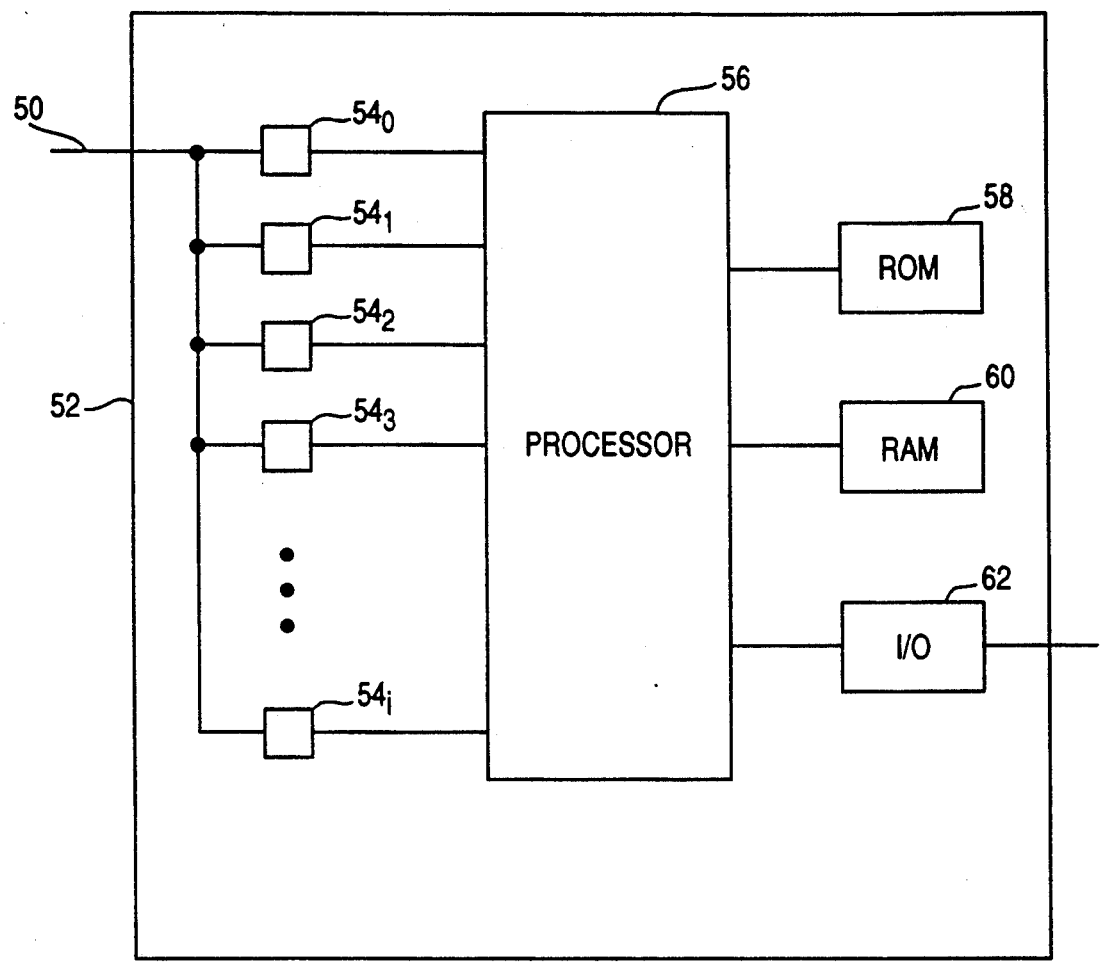
FIG. 3 is a conceptual block diagram of a combination hardware/software system for performing the processes of the present invention.

The processes disclosed with reference to FIGS. 1 and 2 may be performed using an electronic system according to the present invention such as will now be disclosed with reference to FIG. 3, a block diagram of an electronic system capable of adaptive tone recognition in accordance with the principles of the present invention. Those of ordinary skill in the art will recognize that the processes of the present invention may be carried out in a general purpose processing system, such as a personal computer equipped with digital signal processing (DSP) capability. Such DSP capability may be provided, for example, by DSP products available from Rhetorex, Inc., of Campbell, Calif. Such products are available as plug-in bus circuit cards for IBM compatible personal computers.

Referring now to FIG. 3, a signal line 50 is monitored by electronic system 52, including a plurality of bandpass filters $54_0$–$54_i$, where the total number of filters ($i+1$) is equal to the total number of single and discrete expected frequencies which the system is supposed to recognize. The filters should be designed such that the bandwidth of each filter comprises a substantially non-overlapping sub band of the total energy spectrum expected to be encountered. It is preferred that each filter have as its center frequency one of the expected frequencies although it is not critical as long as the expected frequency is not positioned too far down the roll-off curve of the filter's frequency response characteristic.

According to a presently preferred embodiment of the invention, bandpass filters $54_0$–$54_i$ may be digital filters configured according to the Goertzel algorithm, as described in A. Oppenheim and R. Schafer, *Digital Signal Processing*, pp. 287–289, Prentice-Hall 1975, expressly incorporated herein by reference. Design and implementation of such digital filters is well known to those of ordinary skill in the art, and the details of such filters will thus not be repeated herein.

According to one aspect of the present invention, it has been discovered that where digital filters configured according to the Goertzel algorithm are used, the term K/N may be a non-integer fraction, thus making the filters more flexible.

In the presently preferred embodiment, bandpass filters $54_0$–$54_i$ may be associated with processor 56, with an associated program store 58, used to store program commands and tables, and random access memory unit 60 used to temporarily store intermediate data results. Processor 56, program store 58, and random access memory unit 60 may comprise a conventional computer such as an IBM compatible personal computer. The structure and use of such elements is well known to those of ordinary skill in the art. An input/output interface 62 is used to communicate between processor 56 and a PBX unit or other readily available intelligent telephone equipment, which will utilize the information developed by system 58. The particular nature of input-/output interface 62 will depend on the particular PBX unit or other readily available intelligent telephone equipment utilized, and details thereof are not part of the present invention. Those of ordinary skill in the art are knowledgeable concerning the interfacing of system 52 to particular examples of such equipment.

The apparatus described above may be employed for numerous purposes. According to a presently preferred embodiment of the present invention, the apparatus may be employed to recognize a plurality of call-progression signals used in telephone systems, such as telephone company central office switching facilities and PBX equipment. The process of call-progression tone recognition described herein is illustrative only, and those of ordinary skill in the art will recognize that other tones or other types of signals may be recognized using the method of the present invention.

Figure 4A:
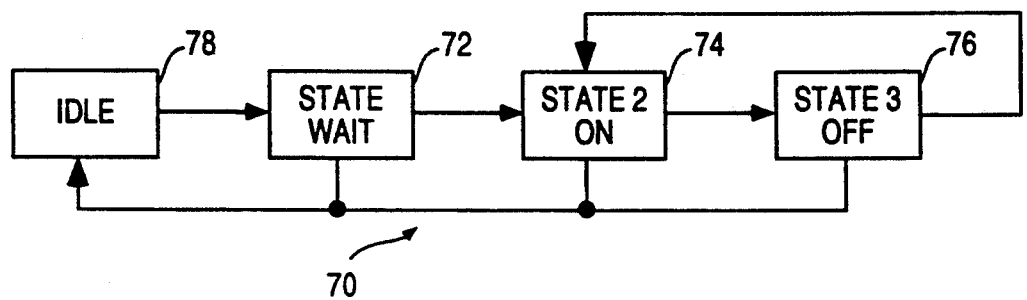
FIG. 4a is a flow diagram for a state machine which implements a process according to the present invention for recognizing call progression tones in a telephone system.

The method of the present invention may be implemented as a state machine. Referring now to FIG. 4a, a flow diagram of the transitions of a presently preferred implementation of a state machine 70 according to the present invention, this aspect of the present invention may be easily understood. FIG. 4a, along with FIG. 4b, a representation of the functionality of a state machine which implements the process illustrated in FIG. 4a and illustrates the correspondence between the signal condition (ON or OFF) and the states of the state machine, shows the operation of the state machine.

Transitions occur in the state machine 70 between a first state shown at block 72, a second state shown at block 74, and a third state shown in block 76, as the call-progression signal transitions from ON (sound) to OFF (silence). When the state machine 70 is not in operation, it is in an idle state 78.

The state machine works in co-operation with a tone table. The tone table contains information necessary for the identification of all of the tones which are expected to be encountered by the recognition system. In a presently preferred embodiment of the invention, the tone table contains multiple entries, or fields, for each tone to be identified. In a typical system for identifying single and dual-frequency tones, the following fields may be used for each tone: an $F_1$ field identifies the first frequency of the tone; an $F_2$ field identifies the second frequency of the tone (only used for dual-frequency tones); a $T_{ONmin}$ field identifies the minimum on time of the tone; a $T_{ONmax}$ field identifies the maximum on time of the tone; a $T_{OFFmin}$ field identifies the minimum off time of the tone; a $T_{OFFmax}$ field identifies the maximum off time of the tone; a Quick-Count field assigns a minimum on time to a tone if that tone can be identified by frequency alone; and an ID field assigns an identifier to the tone.

Figure 5A:
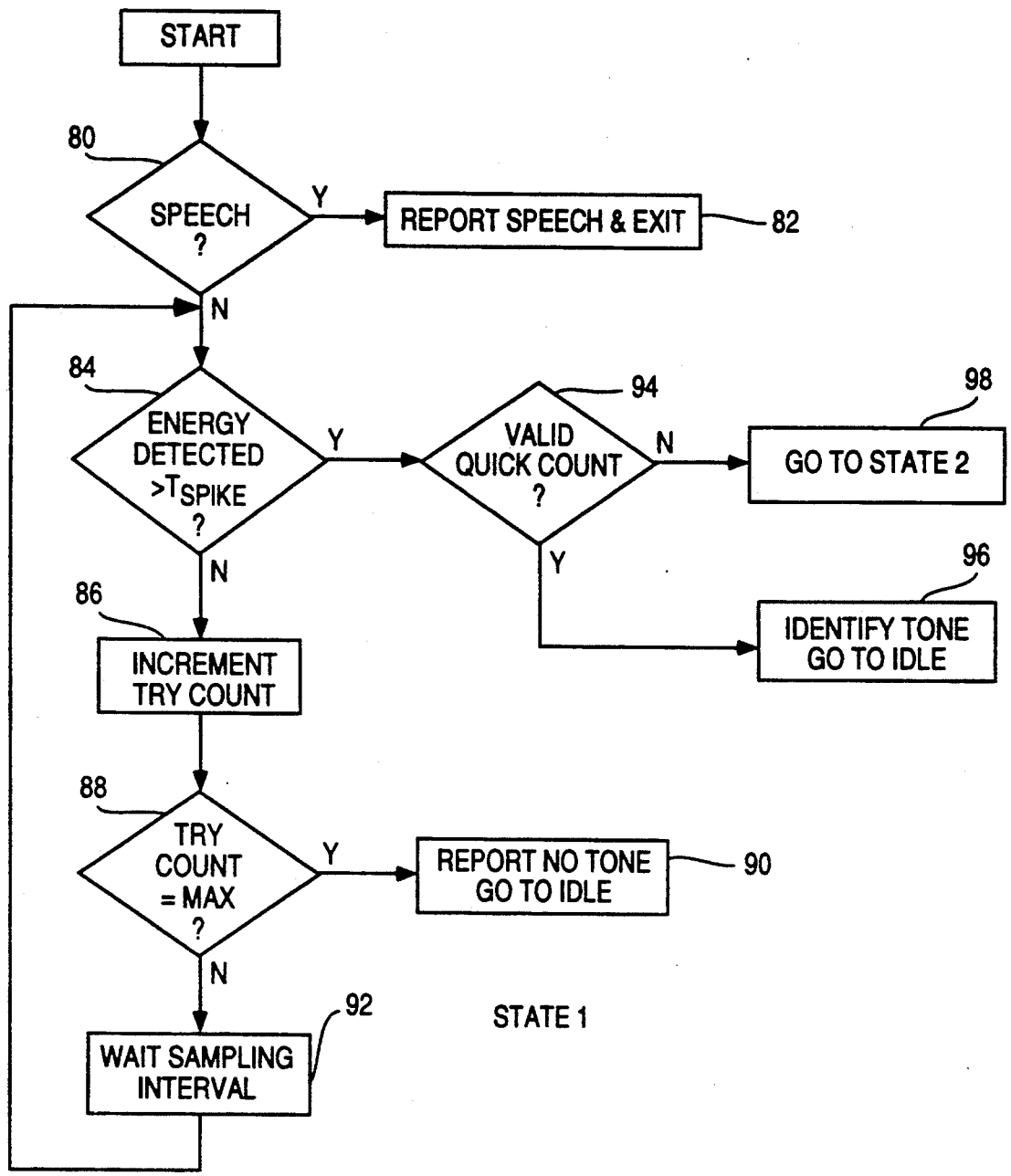
Figure 5B:
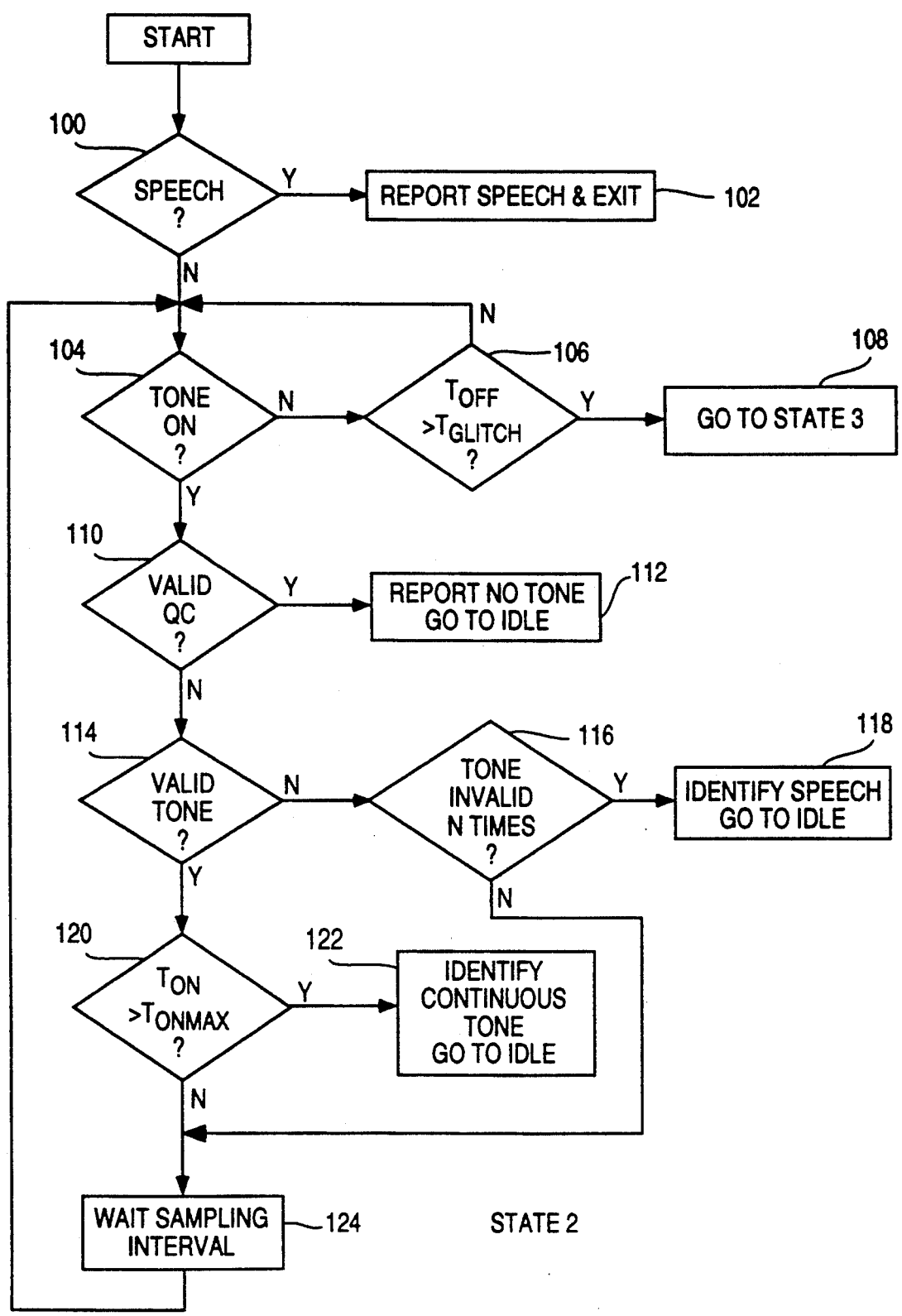
Figure 5C:
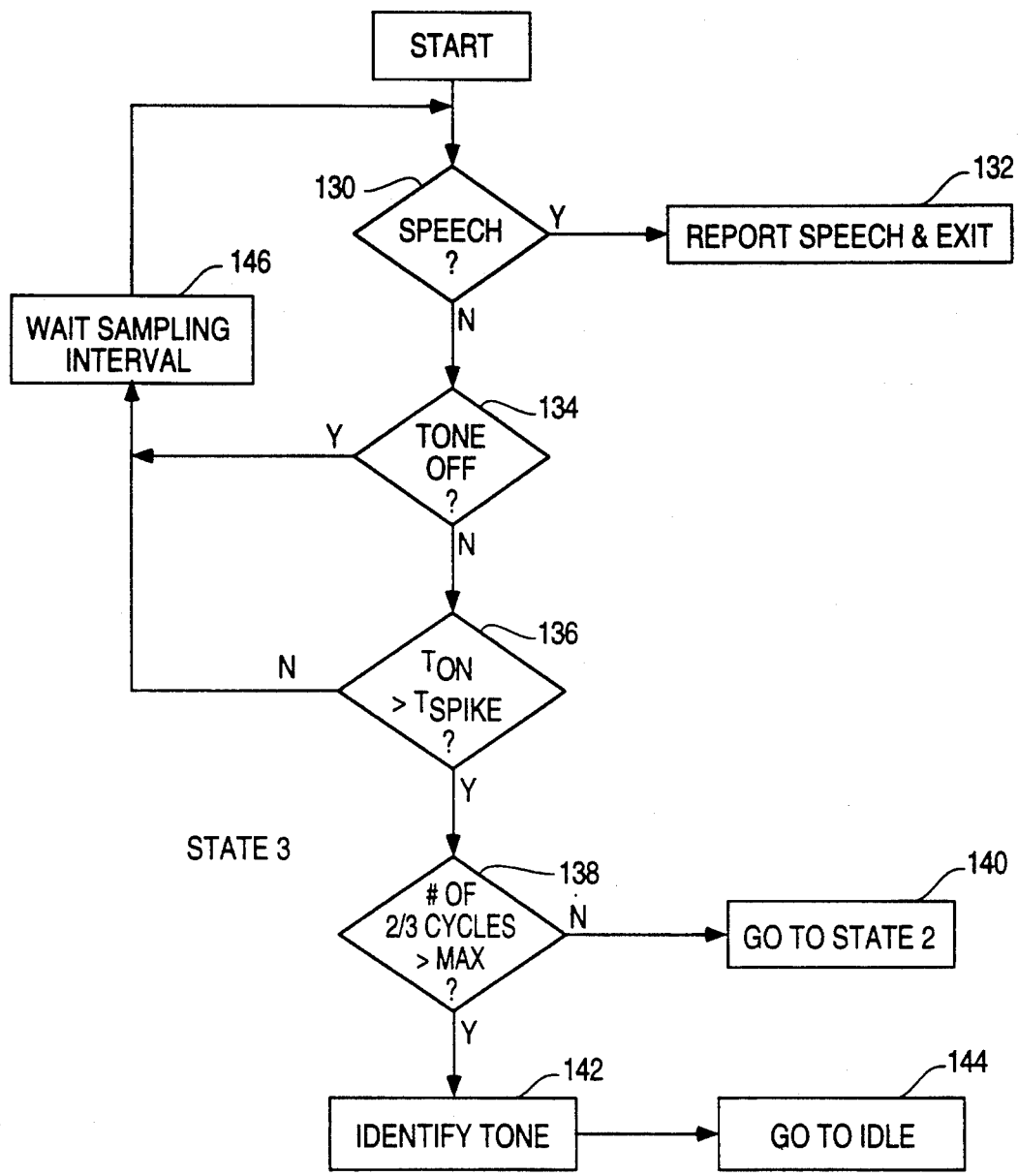

The operation of the state machine may be easily understood with reference to FIGS. 5a–5c, flow diagrams of presently preferred implementations of States 1–3, respectively according to the present invention.

When initialized, for example by a signal indicating a number has been dialed by a telephone set in a telephone system containing the present invention, the state machine enters State 1. The purpose of State 1 is to wait for the first signal to be detected and reported by the filter array as previously described. State 1 is illustrated in FIG. 5a.

The state machine periodically evaluates the reports from the filter array. According to a presently preferred embodiment of the invention, the state machine may examine the filter array output once during every 16.66 millisecond sampling interval, although those of ordinary skill in the art will recognize that other sampling intervals may be used, depending on the particular application to which the present invention is put.

Figure 4B:
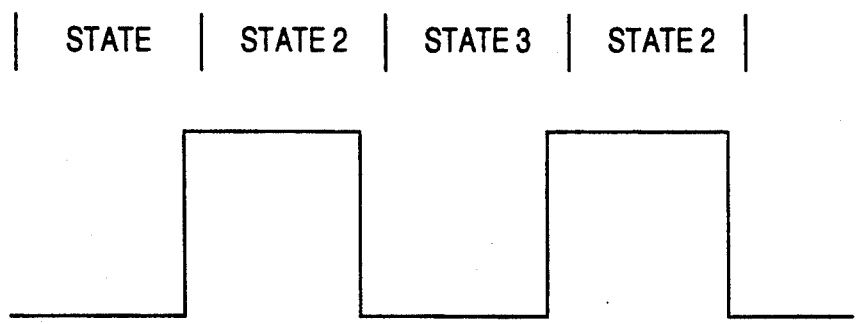

Initially, and as shown in FIG. 4b, the condition of the signal line to be interrogated is silence. This condition is usually followed by the presence of energy on the line as reported by the filter array. First, at decision diamond 80, a determination is made regarding whether speech is present on the line. If so, speech is identified at block 82, and the routine terminates. If not, and as shown in decision diamond 84, State 1 evaluates the condition of the signal line. If no signal is detected, a try count is incremented at step 86 and the try count is interrogated at decision diamond 88 to see if the maximum try count has been reached. If the maximum try count has been reached, the state machine reports no tone at block 90 and goes to idle state (box 78 FIG. 4a). If the maximum try count has not been reached, the state machine waits one sampling interval at box 92 and returns to decision diamond 84.

If the presence of energy on the line has been detected for a period exceeding a predetermined time $t_{spike}$ at decision diamond 84, the state machine proceeds to decision diamond where a decision is made whether the energy can be identified by a Quick Count entry in the tone table on the basis of frequency alone. The purpose of the $t_{spike}$ threshold is to reject random noise spikes on the signal line.

There will probably be certain tones, such as special intercept tones, which can be readily identified by frequency component only. Accordingly, in an illustrative two-frequency tone example, assume that energy having frequency components $F_x$ and $F_y$ is reported by the filter array for a predetermined number of consecutive sampling intervals. If $F_x$ and $F_y$ equal the $F_1$ and $F_2$ values for an entry in the tone table for which a Quick Count decision is permitted, and if $F_x$ and $F_y$ have been reported for a preselected minimum number of sampling intervals specified by the Quick Count entry in the tone table, a tone recognition can be made as shown in decision diamond 92.

If a Quick Count identification can be made, the identity of the tone is reported at block 96 and the state machine goes to idle. If a Quick Count identification cannot be made, the state machine goes to State 2 at box 98.

There are thus three exit conditions from State 1. Pursuant to a first condition, at box 90, there is an exit from State 1 when no tone is detected. Pursuant to a second exit condition, the state machine may terminate its operation if it can readily identify a call progress tone by its frequency components only according to a Quick Count at box 96. Pursuant to a third exit condition, if energy is detected on the signal line by the filter array for the predetermined time threshold, the state machine makes a transition from State 1 to State 2 at box 98.

State 2 of the state machine is illustrated in FIG. 5b. State 2 is coincident with the tone ON state and performs several tasks. First, at decision diamond 100, the state machine determines if speech is present on the line. If so, speech is reported at block 102. If not, at decision diamond 104, it is determined whether the tone is still on. If it is not, control passes to decision diamond 106 where a decision is made regarding whether the tone is off for a period of time longer than $t_{glitch}$. The purpose of this test is to reject signal dropouts which may occur on the line. Random and/or isolated intervals during which no tone is reported can be reported as dropout intervals if the same tone reappears after the one or more consecutive silence intervals within State 2. If the signal is off for a period exceeding $t_{glitch}$, the state machine transitions to State 3 at box 108 and stores information comprising the length of the on time of the tone. This information will be used later to determine the tone cadence. If the signal has not been off for a period exceeding $t_{glitch}$, the signal is considered to still be present and control returns to decision diamond 104.

If decision diamond 104 reports the tone still present, control passes to decision diamond 110, where it is determined if a Quick Count identification can be made. If Quick Count identification can be made, the tone is identified and the state machine returned to the idle state box 112.

If a Quick Count identification cannot be made, control passes to decision diamond 114 where it is determined if the tone is a valid tone. This is done by comparing the reported frequency or frequencies with valid frequency combination entries in the tone table. If the tone is not valid, control is passed to decision diamond 116, where it is determined how many passes have been made with a tone-invalid result. If that number exceeds a predetermined threshold, speech is identified at box 118 and the state machine transitions to the idle state. The purpose of decision diamond 116 is to avoid false results based on momentary distortion on the line.

If a valid tone has been identified, control passes to decision diamond 120, where the ON time of the tone is compared with its $T_{onmax}$ value in the tone table. If the ON time exceeds the $t_{onmax}$ time, the tone is identified as continuous and the state machine returns to idle at box 122.

If the $t_{onmax}$ time has not been exceeded, control passes to box 124, where the state machine waits for the next sampling interval, before returning control to decision diamond 104.

As shown in FIG. 5c, in State 3, the period of silence until another tone is reported present is measured and reported. First, at decision diamond 130, the state machine determines if speech is present on the line. If so, speech is reported at block 132. If not, at decision diamond 134, the absence of energy on the line is monitored. If energy is reported, control passes to decision diamond 136, where it is determined if the energy represents more than a noise spike. If the energy does not comprise a noise spike, a decision is made that valid energy is present and control passes to decision diamond 138. The function of decision diamond 138 is to control the number of times that the state machine switches between State 3 and State 2. If the desired number of State-3/State-2 transitions have not taken place, control passes to box 140 and the state machine transitions to State 2 after storing information comprising the length of the tone- off time for cadence analysis. If the desired number of State-3/State-2 transitions have taken place, control passes to box 142 and the tone is identified. The state machine then goes idle at box 144.

If the result at decision diamond 1334 was that no energy was present, or if the result at decision diamond 136 was that the tone on was merely a noise spike, control passes to box 146, which waits until the next sampling interval before returning control to decision diamond 130.

After the first full cycle of the State-2/State-3 transitions has occurred, the ON time and the OFF time of the tone have been measured once at blocks 108 and 136 of FIGS. 5b and 5c, respectively. Each full cycle of the State-2/State-3 transition allows that measurement to be performed again. The ON time reported by the state machine for State 2 and the and the OFF time reported by the state machine for State 3 provide cadence information for tone identification.

The tone identification at block 138 comprises comparisons of the tone frequency and cadence with the tone table information to identify a match. Once a match has been found, further processing may take place, or an idle state may be entered. For example, if the tone has been identified as a RING type tone, States 2 and 3 are repeated until a change in tone indicates that the call has been answered, or until a preselected time-out interval has passed beyond which it is determined that the call will not be answered.

For all remaining State 2 State 3 transition cycles, the tone table of call progression tones is searched for a matching tone and the signal is compared to previous cycles to validate the continuity of the signal. The database of call progression tones is searched for a tone that matches the cadence or cadence and frequency of the signal being analyzed. If a match is identified, and this cycle exceeds a maximum cycle analysis threshold, call analysis terminates. If the current signal does not compare with the previous signal, and the previous signal was identified as a RING type tone, the call is terminated and marked answered.

If a the signal does not match a database tone, but compares with previous signals, a RING type tone is assumed. Analysis continues until the maximum cycle analysis threshold is exceeded, or the signal fails to compare with previous signals. If the threshold is exceeded, the call is marked not answered. If the comparison fails, the call is marked answered.

According to the present invention, the signal analysis includes a determination of whether the energy on the signal line comprises human speech. This determination may be made according to a presently preferred embodiment of the invention.

Speech may be divided into two components. A first voiced component comprises the English language vowel sounds, and consonants such as "m" "n" etc. A second unvoiced component comprises sounds such as "sh" "th" "p" and "t". While the unvoiced sounds are characterized by little or no correlation, the voiced sounds in speech are highly correlated in the intervals of their pitch. Such a feature recommends the use of correlation techniques as a component of a speech identification method.

Certain applications, notably telecommunications, require reliable detection and identification of both speech sounds and tones, such as call progression tones. Because call progression tones, usually unmodulated sinusoidal tones, are ideally perfectly correlated and practically highly correlated, correlation techniques alone cannot be used to discriminate between speech sounds and tones such as call-progression signals on communications lines.

According to the present invention, a combination of digital real-time signal processing techniques implemented in fixed-point hardware may be employed to readily differentiate between speech sounds and call progression tones. The method of the present invention provides a reliable and economically viable solution to the speech recognition problem. From the description presented herein, those of ordinary skill in the art will recognize that the method of the present invention could be performed by an appropriately programmed personal computer, such as an IBM compatible computer equipped with a 386 processor. Particular software coded instruction routines for carrying out an actual embodiment of the present invention may be easily provided by those of ordinary skill in the art as a routine exercise.

Figure 6:
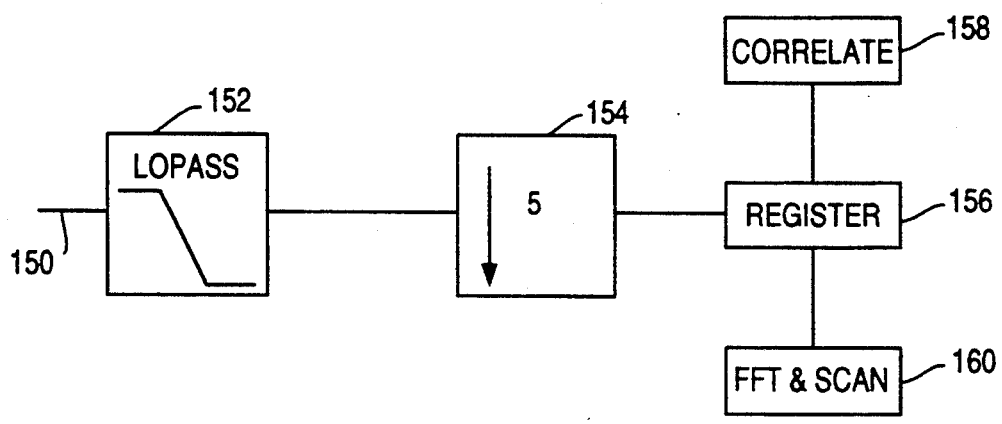
FIG. 6 is a diagram of presently preferred apparatus according to the present invention for performing speech recognition.

Referring first to FIG. 6, a symbolic representation of apparatus according to the present invention is presented. A signal line 150 to be monitored carries a digitized signal which is to be identified. As those of ordinary skill in the art will readily appreciate, this digitized signal may be in PCM format, sampled at a rate of 8,000 samples/sec. Codec apparatus for creating such signals from analog signals is well known and widely used in the art and consequently need not be disclosed herein.

The digitized signal is first processed through low-pass digital filter 152. According to a presently preferred embodiment of the invention, low-pass digital filter 152 may have a linear rolloff characteristic curve in which attenuation begins at 700 Hz and is complete at 800 Hz. Digital filter technology for provision of such a filter is conventional and well understood.

The filtered digital signal is then decimated in circuit block 154 using conventional decimation techniques, preferably by taking every fifth sample, resulting in a data sample rate out of block 14 of 1,600 samples/sec. Those of ordinary skill in the art will recognize that the data samples may be placed in a register 156 for holding while they are processed according to the present method.

According to a presently preferred embodiment of the invention, the digital signal is then subjected to both correlation (block 158) and FFT analysis (block 160). Both of these forms of digital signal processing are well known to those of ordinary skill in the art and are described in texts such as L. R. Rabiner and R. W. Schafer, Digital Processing of Speech Signals, Prentice Hall, 1978, and R. E. Blahut, Fast Algorithms for Digital Signal Processing, Addison Wesley, 1987. Both of these works are expressly incorporated by reference herein. The results of both the correlation and FFT signal processing steps are evaluated to determine if the energy represented by the digital signal on line 12 comprises speech, tone energy, or noise.

Figure 7:
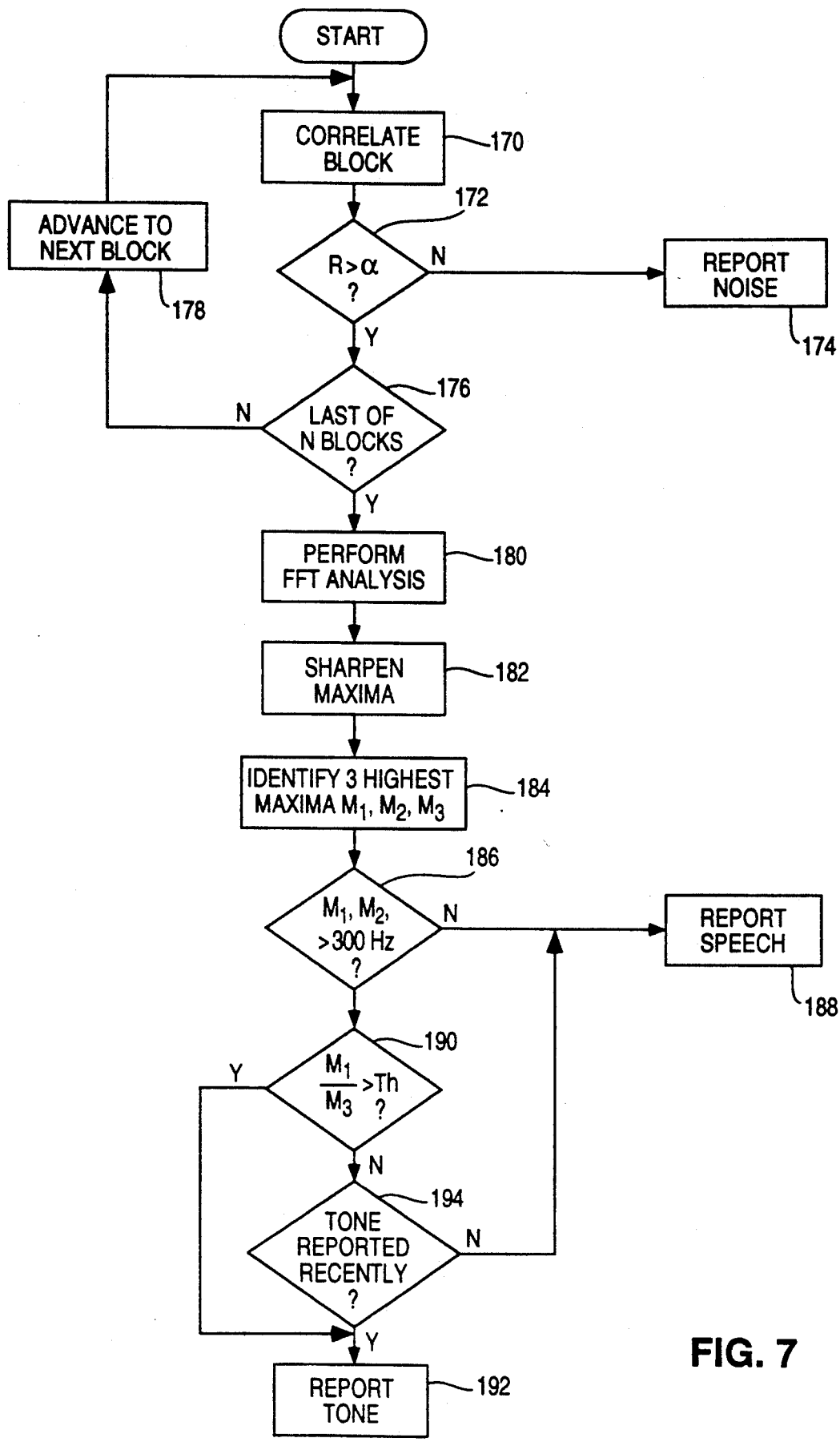
FIG. 7 is a flow diagram showing the steps of a method for real-time human speech recognition according to a presently preferred embodiment of the invention.

A flow diagram representing a method according to a presently preferred embodiment of the invention is depicted in FIG. 7. First, at step 170, correlation is performed on a first block of the data samples. Correlation $R_{xx}(k)$ of two signal samples may be expressed as:

$$R_{xx}(k) = \sum_{n=0}^{N-1} x(n) \cdot x(n+k) \div \left[ sqrt \sum_{n=0}^{N-1} x(n)^2 \cdot sqrt \sum_{n=0}^{N-1} x(n+k)^2 \right] \quad [1]$$

According to the present invention, the correlation lag k is chosen to be within the range of human pitch, i.e., between about 2.5 to 20 msec. In addition, the correlation length is chosen to be at least as long as the maximum human pitch, i.e., about 20 msec. At a sample rate of 1,600 samples/sec., the correlation length should be preferably at least 32 samples. These correlation parameters may be easily specified in a conventional software routine for performing correlation.

Those of ordinary skill in the art will recognize that, in order to be able to perform this digital signal processing economically in real time in a fixed-point hardware environment such as an IBM compatible personal computer, some approximations will need to be employed to simplify the amount of data processing required by the signal processing hardware. According to a presently preferred embodiment of the invention, the maximum R is first determined by employing only the numerator of eq. [1]. At the k value of that maximum R, the function R(k) may be estimated by taking the arithmetic mean rather than the geometric mean specified by the denominator of eq. [1], thus significantly simplifying the amount of processing necessary.

Next, at step 172, the correlation result is compared with a predetermined threshold $\alpha$ to determine if there is a possibility that the energy on the line comprises speech. As presently preferred, the threshold may be between about 0.6 and 0.8. To further simplify the signal processing operations, it is preferable to avoid division operations by multiplying $\alpha$ by the arithmetic mean and comparing it with the numerator of eq. [1]. If the correlation result is below the threshold value $\alpha$, noise is reported at step 174.

There exists the possibility that, even in uncorrelated signals, one random region of a signal will correlate well with a second random region. To avoid false positive results obtained by encountering such glitches, it would be preferable to perform the correlation operation on several consecutive data blocks offset by a time $T_0$, which may be about 10 to 20 msec. If the correlation is below threshold for one or more of the correlation passes, the signal is determined to comprise noise. If the correlation is above threshold for all three passes, there is either speech or tone energy on the line. Steps 176 and 178 illustrate the repetition of the correlation step for N blocks. As previously stated, the presently preferred value for N is 3.

As previously noted, the results of the correlation operation indicate the possibility of speech energy, but can also indicate the presence of call-progression tone energy. Therefore, according to the present energy, the digital signal is also subjected to FFT analysis at step 180 to make the final determination regarding whether speech or tone energy is present on the line.

It is preferable to perform the FFT analysis with sufficient resolution to identify individual tones. At a sample rate of 1,600 samples/sec., an FFT length of 128 will produce a resolution of 12.5 Hz, which is satisfactory for the application disclosed herein. FFT analysis of digital signals is well known.

Next, at step 182, the FFT analysis results may be "sharpened" according to a presently preferred embodiment of the invention under some conditions. Because of the overlapping band coverage of the FFT process, the frequency response at frequencies between the center bandwidth points defined by the FFT are attenuated and may introduce some ambiguity into the determination. According to this aspect of the invention, the maxima are "sharpened" before the maxima are evaluated.

The three highest frequency maxima $M_1$, $M_2$, and $M_3$ are identified at step 184. If the largest or second largest maxima are found to fall below 300 Hz at step 186, speech is identified at step 188 because call progression tones having a frequency of less than 300 Hz are not likely to be employed. If none of the two highest maxima $M_1$ and $M_2$, fall below 300 Hz, the largest maxima $M_1$ is compared with the third highest maxima $M_3$ at step 190. If the ratio exceeds the threshold, the third maxima is significantly lower energy than the first maxima and the energy is identified as a dual tone at step 192. If the ratio of the first and third maxima is below a preselected threshold (i.e., about 8-10 db) the energy may be identified as speech.

Finally, it has been discovered that if a tone is sampled in the time region where it is turned off, there exists the possibility that speech energy can be mistakenly identified. In order to minimize this possibility, the decision to identify speech in an embodiment having a block length of 16 msec can be deferred until three correlations have been reported above threshold and that the FFT analysis has not reported tone energy from the last few, i.e., four, blocks analyzed. This is illustrated at block 194.

Figure 8:
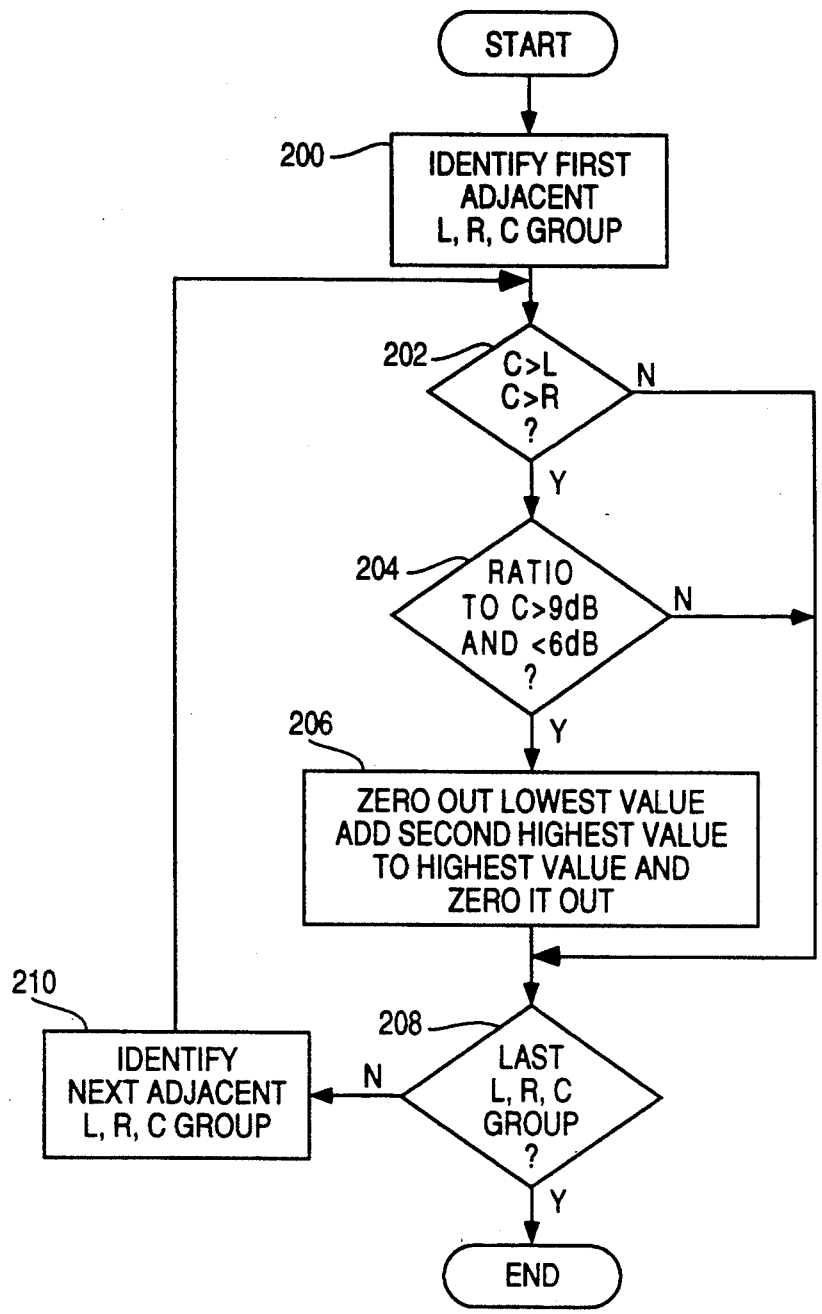
FIG. 8 is a block diagram illustrating a presently preferred method for sharpening the FFT maxima in the process of FIG. 7.

Referring now to FIG. 8, a block diagram illustrates a presently preferred method for sharpening the FFT maxima. The amplitude of the FFT results in adjacent frequency bands are evaluated in groups of three selected in step 200. The magnitude of each band is compared with its right and left hand neighbors in step 202. If, at step 204, it is determined that the center bandwidth has the largest magnitude and the ratio of the center bandwidth to one of its right or left hand immediate neighbors is greater than 9 db and the ratio to the other immediate neighbor is less than 6 db, then the amplitude of the second highest value is added to the amplitude of the highest value and then that second highest band is zeroed out in step 206. At step 208, it is determined whether all groups of three adjacent maxima have been evaluated. If there are no more groups to evaluate, the process terminates. If additional groups exist, at step 210 the next group is identified and the process returns to step 202.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A process for determining the presence of one of a plurality of expected single-frequency signals on a signal line at a selected time including the steps of:

measuring the total signal energy on said signal line at said selected time;

measuring the signal energy present in each one of a plurality of selected separate frequency bands at said selected time, each of said frequency bands encompassing one of the frequencies of said expected single-frequency signals;

identifying the two frequency bands having the highest signal energies and determining the value of the highest signal energy and the second highest signal energy;

determining whether the highest signal energy exceeds a first selected threshold value;

determining whether the highest energy exceeds the second highest energy by greater than a second selected threshold value if the highest signal energy exceeds said first selected threshold value;

determining the amount of out-of-band energy present in all frequency bands other than the frequency band containing the highest signal energy if the highest signal energy is greater than the second highest energy by greater than a second selected threshold value;

determining whether the highest signal energy exceeds the out-of-band energy by greater than a third selected threshold value; and identifying the presence of the one of said expected single frequency signals associated with the one of said selected separate frequency bands having the highest signal energy if the highest signal energy is greater than the out-of-band energy by greater than said third selected threshold value.

2. A process for determining the presence of two of a plurality of expected single-frequency signals on a signal line at a selected time including the steps of:

measuring the total signal energy on said signal line at said selected time;

measuring the signal energy present in each one of a plurality of selected separate frequency bands at said selected time, each of said frequency bands encompassing one of the frequencies of said expected single-frequency signals;

identifying the three frequency bands having the highest signal energies and determining the value of the highest signal energy, the second highest signal energy, and the third highest signal energy;

determining whether the highest signal energy and the second highest signal energy both exceed a first selected threshold value;

determining whether the second highest energy exceeds the third highest energy by greater than a second selected threshold value if both the highest signal energy and second highest signal energy exceed said first selected threshold value;

determining the amount of out-of-band energy present in all frequency bands other than the frequency band containing the highest signal energy if the second highest signal energy exceeds the third highest signal energy by greater than said second selected threshold value;

determining whether the sum of the highest signal energy and second highest signal energy exceeds the out-of-band energy by greater than a third selected threshold value;

determining whether the ratio of the first highest signal energy to the second highest signal energy exceeds a fourth selected threshold value; and identifying the presence of the two of said expected single frequency signals associated with the two of said selected separate frequency bands having the first and second highest signal energies if the ratio of the first highest signal energy to the second highest signal energy exceeds said fourth selected threshold value.

3. A process for determining the presence of one of a plurality of expected single-frequency signals on a signal line at a selected time including the steps of:

measuring the total signal energy $ET_{otal}$ on said signal line at said selected time;

measuring the signal energy present in each one of a plurality of selected separate frequency bands at said selected time, each of said frequency bands encompassing one of the frequencies of said expected single-frequency signals;

identifying the two frequency bands having the highest signal energies and determining the value of the highest signal energy $E_1$ and the second highest signal energy $E_2$;

determining whether the first statement $E_1 > E_{Threshold}$ is true, where $E_{Threshold}$ is a preselected value;

determining whether the second statement $E_1 > E_2 \cdot K_1$ is true where $K_1$ is a first preselected constant;

determining whether the third statement $E_1 > (E_{Total} - E_1) \cdot K_2$ is true, where $K_2$ is a second preselected constant; and identifying the presence of a single-frequency tone as comprising the expected frequency which is in band for the sub bands from which $E_1$ was measured if the first through the third statements are true.

4. A process for determining the presence of two of a plurality of expected a single-frequency signals on a signal line at a selected time including the steps of:

measuring the total signal energy $E_{Total}$ on said signal line at said selected time;

measuring the signal energy present in each one of a plurality of selected separate frequency bands at said selected time, each of said frequency bands encompassing one of the frequencies of said expected single-frequency signals and identifying the three frequency bands having the highest signal energies and determining the value of the highest signal energy $E_1$, the second highest signal energy $E_2$, and the third highest signal energy $E_3$;

determining whether the first statement $E_1 > ET_{hreshold}$ is true, where $E_{Threshold}$ is a preselected value;

determining whether the second statement $E_2 > E_{Threshold}$ is true;

determining whether the third statement $E_2 > E_3 \cdot K_1$ is true, where $K_1$ is a first preselected constant;

determining whether the fourth statement $E_{In} > E_{Out} \cdot K_2$ is true, where $K_2$ is a second preselected constant;

determining whether the fifth statement $E_1/E_2 < K_3$ is true, where $K_3$ is a third preselected constant; and identifying the presence of a dual-frequency tone as comprising the two expected frequencies which are in band for the sub bands from which $E_1$ and $E_2$ were measured if the first through the fifth statements are true.

5. A method for identifying expected call progression signals on a telephone line, comprising the steps of:

(1) sensing the presence of energy on said line, identifying the energy as speech if the energy comprises speech, and proceeding to step (2) if the energy does not comprise speech;

(2) identifying the frequency content and duration of said energy;

(3) comparing said frequency content of said energy with stored information comprising the frequency content of expected signals and identifying said energy as one of said expected call progression signals if a match is found;

(4) sensing the presence of silence on said line if no match is found;

(5) identifying the duration of said silence;

(6) repeating steps (1) through (5) for a predetermined number of times; and then (7) comparing said frequency content of said energy, said duration of said energy, and said duration of said silence with stored information comprising the frequency content of energy, the duration of energy, and the duration of silence for a plurality of expected call progression signals and identifying said energy as one of said expected call progression signals if a match is found.

* * * * *

UNITED STATES PATENT AND TRADEMARK OFFICE
CERTIFICATE OF CORRECTION

PATENT NO. : 5,321,745
DATED : 06/14/94
INVENTOR(S) : Drory et al.

It is certified that error appears in the above-identified patent and that said Letters Patent is hereby corrected as shown below:

In column 1, line 56, please replace "identify" with --indentifying--.

In column 2, line 28, please replace "ration" with --ratio--.

In column 10, line 13, please replace "1334" with --134--.

In column 12, line 63, please replace "energy" with --invention--.

In column 15, line 43, please delete "a".

Signed and Sealed this

Eleventh Day of October, 1994

Attest:

BRUCE LEHMAN

*Attesting Officer*  *Commissioner of Patents and Trademarks*